United States Patent
Sun et al.

(10) Patent No.: US 9,683,160 B1
(45) Date of Patent: Jun. 20, 2017

(54) COMPOSITION COMPRISING A NANOMETER FILM STRUCTURED RESERVOIR PROTECTING AGENT AND A WATER BLOCK PREVENTING AGENT, AND DRILLING FLUID CONTAINING THE SAME AND USE THEREOF FOR DRILLING IN LOW-PERMEABILITY RESERVOIRS

(71) Applicant: China University of Petroleum (East China), Qingdao, Shandong (CN)

(72) Inventors: Jinsheng Sun, Shandong (CN); Jingping Liu, Shandong (CN); Kaihe Lv, Shandong (CN)

(73) Assignee: CHINA UNIVERSITY OF PETROLEUM (EAST CHINA) (CN)

( * ) Notice: Subject to any disclaimer, the term of this patent is extended or adjusted under 35 U.S.C. 154(b) by 0 days.

(21) Appl. No.: 15/400,555

(22) Filed: Jan. 6, 2017

(30) Foreign Application Priority Data

Nov. 7, 2016 (CN) .......................... 2016 1 0975258

(51) Int. Cl.
*C09K 8/24* (2006.01)
(52) U.S. Cl.
CPC ............ *C09K 8/24* (2013.01); *C09K 2208/10* (2013.01)
(58) Field of Classification Search
None
See application file for complete search history.

(56) References Cited

U.S. PATENT DOCUMENTS

| | | | |
|---|---|---|---|
| 7,655,603 B2 * | 2/2010 | Crews ...................... | C09K 8/52 166/305.1 |
| 2006/0258541 A1 * | 11/2006 | Crews ...................... | C09K 8/52 507/203 |
| 2014/0374097 A1 * | 12/2014 | Morgan .................. | C04B 28/02 166/293 |

* cited by examiner

*Primary Examiner* — Jeffrey Washville
(74) *Attorney, Agent, or Firm* — Calfee, Halter & Griswold LLP

(57) ABSTRACT

The present invention relates to the petroleum drilling field and discloses a reservoir protecting agent composition comprising a structured nanometer film reservoir protecting agent and a water block preventing agent, a drilling fluid containing the same and use thereof for drilling in low-permeability reservoirs. The reservoir protecting agent composition comprises a structured nanometer film reservoir protecting agent and a water block preventing agent, wherein the structured nanometer film reservoir protecting agent comprises montmorillonite laminas, structural units represented by formula (1) and structural units represented by formula (2),

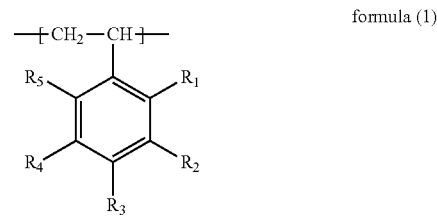

formula (1)

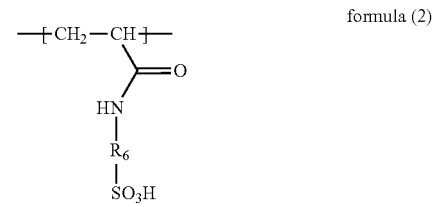

formula (2)

wherein each of $R_1$, $R_2$, $R_3$, $R_4$ and $R_5$ is independently selected from H, $C_1$-$C_4$ alkyl and $C_1$-$C_4$ alkoxy, $R_6$ is $C_1$-$C_6$ alkylene. The present invention further provides a drilling fluid that contains the reservoir protecting agent composition according to the present invention. The drilling fluid that contains the reservoir protecting agent composition according to the present invention exhibits favorable rheology property, temperature-tolerant property, anti-collapse performance and reservoir protection property when used for drilling in low-permeability reservoirs.

18 Claims, No Drawings

COMPOSITION COMPRISING A NANOMETER FILM STRUCTURED RESERVOIR PROTECTING AGENT AND A WATER BLOCK PREVENTING AGENT, AND DRILLING FLUID CONTAINING THE SAME AND USE THEREOF FOR DRILLING IN LOW-PERMEABILITY RESERVOIRS

CROSS REFERENCE TO RELATED APPLICATIONS

This application claims priority to Chinese Application No. 201610975258.2 filed on Nov. 7, 2016 entitled "Reservoir Protecting Agent Composition, Drilling Fluid Containing the Same and Use thereof for Drilling in Low-Permeability Reservoirs", which is hereby incorporated by reference in its entirety as if wholly recited herein.

FIELD OF THE INVENTION

The present invention relates to the petroleum drilling field in particular to a reservoir protecting agent composition a drilling fluid that contains the reservoir protecting agent composition and an application of the reservoir protecting agent composition or the drilling fluid in drilling in low-permeability reservoirs.

BACKGROUND OF THE INVENTION

Drilling fluids are one of the important guarantee measures that ensure safe, high-quality, efficient and rapid drilling production operation, and in oil field exploitation operation drilling fluids are needed.

Effective reservoir protection is an important guarantee for a high rate of oil and gas recovery, so as to attain an optimal negative skin coefficient. If the drilling fluid is designed or used improperly, the liquid and solid in the drilling fluid may intrude into the reservoir and have physical and chemical reactions with the clay and other minerals in the reservoir in the drilling process, causing severely decreased reservoir permeability in the immediate vicinity of the well and increased resistance against oil and gas flow to the bottom of the well and thereby resulting in a decreased oil production.

Generally speaking, the permeability of a low-permeability reservoir is 10-100 mD (millidarcy); therefore protectants designed for medium-permeability, high-permeability and super-high-permeability reservoirs are not suitable for protection of low-permeability reservoirs. Drilling in low-permeability reservoirs encounters various damages, for example reservoir damage resulted from clogging of solid particles in the drilling fluid, reservoir damage resulted from hydrated swelling and dispersed migration of the clay and minerals and reservoir damage resulted from water blocking etc.

Field tests have demonstrated that the above-mentioned damages to low-permeability reservoirs are difficult to solve with existing reservoir protecting agents and drilling fluids. It is extremely important to develop new reservoir protecting agents and drilling fluids for reservoir protection which are suitable for use under the present complex geological conditions. Up to now through long-time research on reservoir protective drilling fluids, treating agent and drilling fluid systems such as temporary plugging drilling fluids that utilize calcium carbonate and deformable particles as a core treating agent and temporary plugging drilling fluids that utilize alkali soluble micrometer-level cellulose as a temporary plugging agent have been developed in China and foreign countries. However, owing to the non-homogeneity of low-permeability reservoirs, different protective materials are hard to match with low-permeability reservoirs effectively and their reservoir protective effects are not satisfactory. There is an urgent need for a novel protectant and drilling fluid system that is suitable for low-permeability reservoirs.

Existing drilling fluids can essentially meet the requirement for cuttings carrying and well wall stability, but their low-permeability reservoir protection effects are not ideal; consequently the reservoir core permeability recovery rate is low. Though reservoir protecting agents are added in the drilling fluids, the characteristics of low-permeability reservoirs are not taken into consideration fully. Therefore the reservoir protection effect is not ideal and filtrate intrusion into the reservoir often occurs, resulting in damages such as water sensitivity and water blocking etc.

SUMMARY

To overcome the above-mentioned drawbacks of existing reservoir protecting agents and drilling fluids for low-permeability reservoirs in the prior art, the present invention provides a reservoir protecting agent composition, a drilling fluid containing the same and use thereof for drilling in low-permeability reservoirs. The reservoir protecting agent composition and drilling fluid provided in the present invention are especially suitable for protection of low-permeability reservoirs, exhibiting favorable rheology property, temperature-tolerant property, anti-collapse property and reservoir protection property.

To attain the object described above, in a first aspect, the present invention provides a reservoir protecting agent composition comprising a structured nanometer film reservoir protecting agent and a water block preventing agent, wherein the structured nanometer film reservoir protecting agent comprises montmorillonite laminas, structural units represented by formula (1) and structural units represented by formula (2),

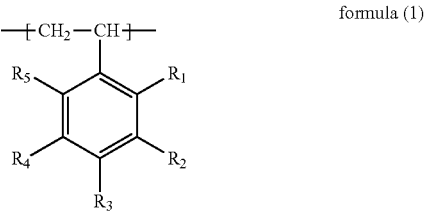

formula (1)

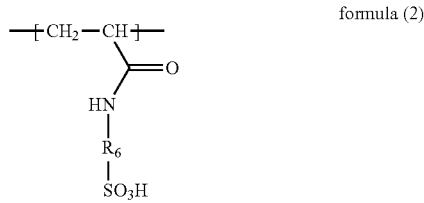

formula (2)

wherein each of $R_1$, $R_2$, $R_3$, $R_4$ and $R_5$ is independently selected from H, $C_1$-$C_4$ alkyl and $C_1$-$C_4$ alkoxy, $R_6$ is $C_1$-$C_6$ alkylene.

In a second aspect, the present invention provides a drilling fluid which contains the reservoir protecting agent composition according to the present invention.

In a third aspect, the present invention provides a use of the reservoir protecting agent composition according to the present invention or the drilling fluid according to the present invention for drilling in low-permeability reservoirs.

In the present invention, a structured nanometer film reservoir protecting agent and a water block preventing agent are used in combination to obtain a reservoir protecting agent composition which can effectively plugging a low-permeability reservoir to prevent the occurrence of problems such as water blocking and water sensitivity and thereby can effectively protect the reservoir. In addition, the drilling fluid that contains the reservoir protecting agent composition according to the present invention exhibits favorable rheology property, temperature-tolerant property, anti-collapse property and reservoir protection property when used for drilling in low-permeability reservoirs.

In the reservoir protecting agent composition provided in the present invention, a monomer in a specific structure is intercalated into organic montmorillonite laminas and an in-situ polymerization reaction is executed to obtain a nanometer composite material in which montmorillonite laminas are dispersed in an amphiphilic block polymer substrate at a nanometer level, i.e. a structured nanometer film reservoir protecting agent which integrates the rigidity, dimensional stability and thermostability of montmorillonite with the properties of the block polymer (i.e. amphipathy of the molecular chains and micro-phase separation of the molecular structure etc.) seamlessly, so that the material significantly improves the physical and mechanical properties of the polymer on the basis of the original outstanding properties of the block polymer.

Using the structured nanometer film reservoir protecting agent, drilling fluid intrusion into the reservoir in the drilling process can be effectively eliminated and thereby an effect of reservoir protection is attained. It is proven that the structured nanometer film reservoir protecting agent provided in the present invention can remarkably improve the core permeability recovery rate of a low-permeability reservoir. For example, in the case of poly-[styrene-montmorillonite laminas-2-acrylamido-2-methyl propanesulfonic acid], owing to: (1) the strongly hydrophilic sulfonate groups on the structured nanometer film reservoir protecting agent compensates the zeta potential decreased by compression of the electric double layers by $Na^+$ or $Ca^{2+}$ and thereby effectively inhibit the tendency of agglomeration of the clay particles; (2) under the hydrophobic association effect of polystyrene chain segments in the structured nanometer film reservoir protecting agent, more physically cross-linked points exist in the macromolecular groups and these physically cross-linked points protect the fine particles in the system, and restrain the flow of free water in the cross-linked network structure and thereby reduce the filter loss in the drilling fluid system; (3) the polystyrene chain segments in the structured nanometer film reservoir protecting agent are self-assembled into nanometer-level micelles under the hydrophobic association effect so that the hydrophilic poly-2-acrylamido-2-methyl propanesulfonic acid chain segments enter into the pores in the mud cake and form nanometer-level micelles that stay outside of the pores and attain a plugging effect; thus a dense mud cake is formed, the permeability is decreased, the mud cake quality is improved and thereby the filter loss in the drilling fluid system is reduced. In addition the hydrophilic sulfonate groups can adhere to the surface of reservoir rock while the hydrophobic groups protrude outwards away from the rock surface, endowing the rock surface with a hydrophobic film which can inhibit infiltration of free water in the drilling fluid into the reservoir and thereby protects the reservoir from the damages of the drilling fluid.

A low-permeability reservoir has small pores and low permeability, and may suffer water blocking damage at different degrees when it encounters a water-based drilling fluid and it is difficult to recover from the damage once the damage happens. In view of the above problem, the reservoir protecting agent composition provided in the present invention comprises a water block preventing agent (e.g. trimethyl-1-propanaminium iodide). Owing to the fact that fluorine atoms are very difficult to be polarized, the fluorocarbon chains have very low polarity and thereby have strong hydrophobic and oleophobic properties; in addition the molecules of a fluorocarbon surfactant tend to accumulate and align directionally into a molecular film on rock surface, modifying the oleophilic and hydrophilic properties of the rock to hydrophobic and oleophobic properties. Therefore when the water block preventing agent is added into the drilling fluid for drilling in a low-permeability reservoir, not only the intrusion of the drilling fluid into the reservoir can be prevented, the occurrence of water blocking damage can be reduced and the direct contact of the reservoir rock surface with external fluids can be prevented because of the modification of the wetting property of the rock surface; hence the occurrence of reservoir damages can be avoided. The water block preventing agent used in the present invention can remarkably decrease surface tension and oil-water interfacial tension and inhibit capillary imbibition of the reservoir rock, has high temperature-tolerance property and high chemical stability, can effectively inhibit the water blocking effect and can work with the structured nanometer film reservoir protecting agent to exert a good synergetic effect so as to attain a variety of synergetic reservoir protection effects.

Other features and advantages of the present invention will be further detailed in the embodiments hereunder.

DETAILED DESCRIPTION

Hereunder some embodiments of the present invention will be detailed. It should be appreciated that the embodiments described here are only provided to describe and explain the present invention but shall not be deemed as constituting any limitation to the present invention.

The endpoint values and any value in the ranges disclosed in the present invention are not limited to the exact ranges or values. Instead those ranges or values shall be comprehended as encompassing values that are close to those ranges or values. For numeric ranges, between the endpoint values of the ranges, between the endpoint values of the ranges and the individual point values, and between the individual point values can be combined to obtain one or more new numeric ranges which shall be deemed as having been disclosed specifically in this document.

In a first aspect, the present invention provides a reservoir protecting agent composition which comprises a structured nanometer film reservoir protecting agent and a water block preventing agent, wherein the structured nanometer film reservoir protecting agent comprises montmorillonite laminas, structural units represented by formula (1) and structural units represented by formula (2),

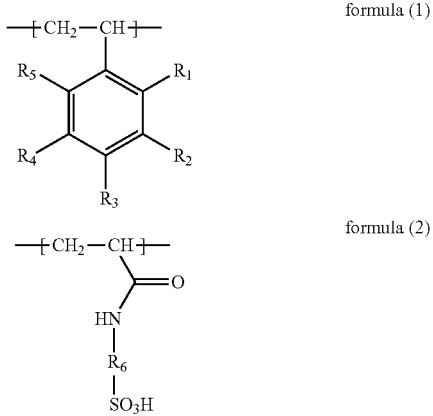

formula (1)

formula (2)

wherein each of $R_1$, $R_2$, $R_3$, $R_4$ and $R_5$ is independently selected from H, $C_1$-$C_4$ alkyl and $C_1$-$C_4$ alkoxy, $R_6$ is $C_1$-$C_6$ alkylene.

In the reservoir protecting agent composition provided in the present invention, to further improve the reservoir protection performance of the reservoir protecting agent composition, in certain embodiments the mass ratio of the structured nanometer film reservoir protecting agent to the water block preventing agent is 100:(1-10) further in certain embodiments is 100:(3-6).

In the reservoir protecting agent composition provided in the present invention, for the convenience of use, in certain embodiments the structured nanometer film reservoir protecting agent and the water block preventing agent are packed respectively and independently.

Those skilled in the art should appreciate that in the reservoir protecting agent composition provided in the present invention, the structured nanometer film reservoir protecting agent according to the present invention is a nanometer composite material formed by intercalating a monomer in a specific structure into organic montmorillonite laminas and having an in-situ polymerization reaction so that the montmorillonite laminas are dispersed in an amphiphilic block polymer substrate at nanometer level.

In certain embodiments each of $R_1$, $R_2$, $R_3$, $R_4$ and $R_5$ is independently selected from H, $C_1$-$C_3$ alkyl and $C_1$-$C_3$ alkoxy, further in certain embodiments is independently selected from H, methyl, ethyl, methoxy and ethoxy, still further in certain embodiments is independently selected from H, methyl and ethyl.

In the reservoir protecting agent composition according to the present invention, to further improve the reservoir protection performance of the structured nanometer film reservoir protecting agent and the reservoir protecting agent composition, in certain embodiments $R_6$ is methylene, ethylidene, propylidene or butylidene, further in certain embodiments is butylidene, i.e. —$C(CH_3)_2$—$CH_2$—.

In the reservoir protecting agent composition according to the present invention, to further improve the reservoir protection performance of the structured nanometer film reservoir protecting agent and the reservoir protecting agent composition, in certain embodiments the mass ratio of the structural units represented by formula (1) and the montmorillonite laminas is 1:(0.02-0.1) further in certain embodiments is 1:(0.03-0.05); the molar ratio of the structural units represented by formula (1) to the structural units represented by formula (2) is 1:(1-5) including 1:(2-4).

In the reservoir protecting agent composition provided in the present invention, to further improve the reservoir protection performance of the reservoir protecting agent composition, in certain embodiments the water block preventing agent is trimethyl-1-propanaminium iodide represented by a structural formula $CF_3(CF_2)_7SO_2NHCH_2CH_2CH_2N^+(CH_3)_2$ $CH_3I$ which is commercially available.

In the reservoir protecting agent composition provided in the present invention, in certain embodiments the structured nanometer film reservoir protecting agent is prepared with a method comprising the following steps:

(1) intercalating a monomer M1 into organic montmorillonite and having an in-situ polymerization reaction in the presence of a chain-transfer agent and a first initiator to obtain [M1]n/montmorillonite;

(2) using the [M1]n/montmorillonite obtained in step (1) as a macromolecular chain transfer agent, and mixing the [M1]n/montmorillonite with a second initiator and a monomer M2 to have a polymerization reaction, and then removing the [M1]n homopolymer in the reaction product to obtain a structured nanometer film reservoir protecting agent; where the structural formulaes of the monomer M1 and the monomer M2 are:

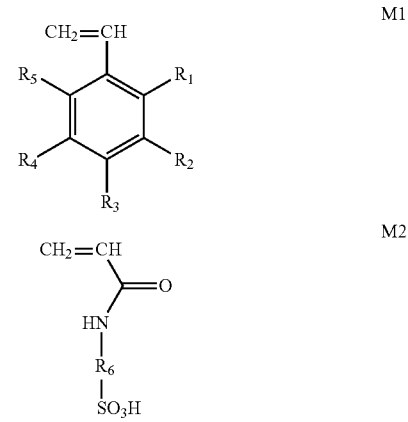

wherein each of $R_1$, $R_2$, $R_3$, $R_4$ and $R_5$ is independently selected from H, $C_1$-$C_4$ alkyl and $C_1$-$C_4$ alkoxy, $R_6$ is $C_1$-$C_6$ alkylene.

Those skilled in the art should appreciate that in the method described above the in-situ polymerization reaction can be implemented in two steps through a reversible addition-fragmentation chain transfer process: the first step is to synthesize [M1]/n montmorillonite that will be used as a macromolecular chain transfer agent in the second step and further increase the interlayer spacing between the organic montmorillonite laminas; the second step is adding a monomer M2 to synthesize an amphiphilic block polymer/montmorillonite.

In certain embodiments each of $R_1$, $R_2$, $R_3$, $R_4$ and $R_5$ is independently selected from H, $C_1$-$C_3$ alkyl and $C_1$-$C_3$ alkoxy, further in certain embodiments $R_1$, $R_2$, $R_3$, $R_4$ and $R_5$ is independently selected from H, methyl, ethyl, methoxy and ethoxy, still further in certain embodiments $R_1$, $R_2$, $R_3$, $R_4$ and $R_5$ is independently selected from H, methyl and ethyl.

In the method described above, to further improve the reservoir protection performance of the structured nanometer film reservoir protecting agent and the reservoir protecting agent composition obtained with the method, $R_6$ is methylene, ethylidene, propylidene or butylidene, in certain embodiments $R_6$ is butylidene, i.e. —$C(CH_3)_2$—$CH_2$—.

In the method described above, to further improve the reservoir protection performance of the structured nanometer film reservoir protecting agent and the reservoir protecting agent composition obtained with the method, in certain embodiments the mass ratio of the monomer M1 to the organic montmorillonite is 1:(0.02-0.1) in certain embodiments the mass ratio is 1:(0.03-0.05); the molar ratio of the monomer M1 to the monomer M2 is 1:(1-5) in certain embodiments the mass ratio is 1:(2-4).

in certain embodiments of step (1) the molar ratio of the monomer M1, the chain-transfer agent and the first initiator is (200-600):1:(0.2-0.6) including (200-400):1:(0.3-0.4).

In certain embodiments, in step (2) the mass ratio of the monomer M2 to the second initiator is 1:(0.02-0.1) further in certain embodiments is 1:(0.03-0.05).

In the method described above, there is no particular restriction on the chain-transfer agent, i.e., the chain-transfer agent may be any chain-transfer agent commonly used in the art, preferably the chain-transfer agent is dithioate further preferably is at least one of benzyl dithiobenzoate, 2-cyanoprop-2-yl dithionaphthalenoate (α-CPDN), cumyl dithiobenzoate and cumenyl dithiobenzoate (CDB).

In the method described above, there is no particular restriction on the first initiator, i.e., the first initiator may be any initiator commonly used in the art, preferably the first initiator is at least one of 2,2'-azobis(2-methylpropionitrile), 1,1'-azobis(cyclohexane-1-carbonitrile), dibenzoyl peroxide and 2,2'-azobisisoheptonitrile.

In the method described above, there is no particular restriction on the second initiator, i.e., the second initiator may be any initiator commonly used in the art, preferably the second initiator is at least one of 2,2'-azobis(2-methylpropionitrile), 1,1'-azobis(cyclohexane-1-carbonitrile), dibenzoyl peroxide and 2,2'-azobisisoheptonitrile.

In the method described above, in step (1) there is no particular restriction on the conditions of the in-situ polymerization reaction, i.e., the conditions may be ordinary conditions commonly used in the art; preferably in step (1) the conditions of the in-situ polymerization reaction include: 100-130° C. of reaction temperature and 2-5 h of reaction time.

In the method described above, in step (2) there is no particular restriction on the conditions of the polymerization reaction, i.e., the conditions may be ordinary conditions commonly used in the art; preferably in step (2) the conditions of the polymerization reaction include: 55-70° C. of reaction temperature and 5-12 h of reaction time.

In the method described above, after each of step (1) and step (2) the respective reaction system must be cooled and the reaction product must be precipitated in acetone or methanol or methanol/water mixed solution. The above-mentioned steps are known to those skilled in the art and will not be detailed further here.

In the method described above, there is no particular restriction on the method for removing the [M1]n homopolymer in the reaction product, i.e., the method may be any method commonly used in the art. For example the [M1]n homopolymer in the reaction product may be removed by extracting with methyl benzene.

In a second aspect, the present invention provides a drilling fluid which contains the reservoir protecting agent composition according to the present invention. The reservoir protecting agent composition provided in the present invention is especially suitable for protection of low-permeability reservoirs. Hence a drilling fluid that contains the reservoir protecting agent composition provided in the present invention is especially suitable for protection of low-permeability reservoirs.

Preferably measured on the basis of 100 ml drilling fluid, the amount of the reservoir protecting agent composition is 1-5 g.

In the present invention, there is no particular restriction on the drilling fluid system that contains the reservoir protecting agent composition provided in the present invention, i.e., the drilling fluid system may be any conventional drilling fluid system in the art, as long as the reservoir protecting agent composition provided in the present invention is added into the conventional drilling fluid system. When the reservoir protecting agent composition provided in the present invention is used, the constituents of the reservoir protecting agent composition can be added into the drilling fluid system, and there is no particular restriction on the adding sequence of the constituents.

Specifically, the drilling fluid further contains one or more of clay, flocculating agent, inhibiting agent, plugging agent, viscosity improver, filtrate reducer and lubricant besides the reservoir protecting agent composition provided in the present invention, wherein the selection and amounts of the above-mentioned constituents may be determined according to the actual circumstance.

In the drilling fluid according to the present invention, there is no particular restriction on the contents of the clay, flocculating agent, inhibiting agent, plugging agent, viscosity improver, filtrate reducer and lubricant, i.e., the contents may be ordinary contents commonly used in the art. For example, measured on the basis of 100 ml drilling fluid, the amount of clay may be 0-5 g, the amount of the flocculating agent may be 0-5 g, the amount of the inhibiting agent may be 0-8 g, the amount of the plugging agent may be 0-5 g, the amount of the viscosity improver may be 0-1 g, the amount of the filtrate reducer may be 0-5 g, and the amount of the lubricant may be 0-5 g.

In the drilling fluid according to the present invention, there is no particular restriction on the species of the clay, flocculating agent, inhibiting agent, plugging agent, viscosity improver, filtrate reducer and lubricant, i.e., they may be any clay, flocculating agent, inhibiting agent, plugging agent, viscosity improver, filtrate reducer and lubricant commonly used in the art respectively; preferably the clay is bentonite; the flocculating agent is at least one of polyacrylamide, potassium salt of acrylonitrile copolymer, acrylamide-sodium acrylate copolymer and zwitter-ionic macromolecular polymer; the inhibiting agent is at least one of potassium chloride, sodium chloride, amine inhibiting agent, sodium silicate and polyethylene glycol; the plugging agent is at least one of bitumen, sulfonated bitumen, calcium carbonate, nanometer silicon dioxide and nanometer barite, the viscosity improver is highly viscous polyanionic cellulose, highly viscous sodium carboxymethyl cellulose, acrylate-acrylamide copolymer and hydroxyethyl cellulose; the filtrate reducer is at least one of sodium carboxymethyl cellulose, alkaline lignite, extract sodium nitro humate, sulfonated lignite resin, low-viscosity polyanionic cellulose, polyacrylamide, chromium humate, sulfonated phenolic resin, sulfomethylated phenolic resin and hydroxypropyl starch; the lubricant is plastic pellets and/or graphite. All of the above-mentioned clay, flocculating agent, inhibiting agent, plugging agent, viscosity improver, filtrate reducer and lubricant are common materials in the art and are commercially available.

In the present invention, there is particular restriction on the method for preparation of the drilling fluid as long as the constituents are mixed in the respective amounts as described above.

In a third aspect, the present invention provides a use of the reservoir protecting agent composition according to the present invention or the drilling fluid according to the present invention for drilling in low-permeability reservoirs.

Preferably the permeability of the low-permeability reservoir is 10-100 mD (millidarcy).

EXAMPLES

Hereunder the present invention will be detailed in some examples but it should be noted that the present invention are not limited to those examples. In the following preparation examples, examples and comparative examples unless otherwise specified all of the materials are commercially available and all of the methods are conventional method in the art.

2-acrylamido-2-methyl propanesulfonic acid is purchased from Chengdu Gelei Xiya Chemical Technology Co. Ltd.

Benzyl dithiobenzoate, 2-cyanoprop-2-yl dithionaphthalenoate, cumyl dithiobenzoate and cumenyl dithiobenzoate are purchased from Nanjing Chalf-Pharm Technology Co. Ltd.

Styrene, p-methyl styrene, p-methoxy styrene and n-butyl styrene are purchased from Chengdu Gelei Xiya Chemical Technology Co. Ltd.

Cetyl trimethyl ammonium chloride is purchased from Shanghai Fusheng Industry Co. Ltd.

Sodium montmorillonite is purchased from Xinjiang Zhongfei Xiazijie Bentonite Co. Ltd.

2,2'-azobis(2-methylpropionitrile), 2,2'-azobisisoheptonitrile, dibenzoyl peroxide and 1,1'-azobis(cyclohexane-1-carbonitrile) are purchased from Chengdu Gelei Xiya Chemical Technology Co. Ltd.

Trimethyl-1-propanaminium iodide is purchased from Chengdu Chunfeng Petroleum Science and Technology Co. Ltd.

Preparation Example 1

1. Preparation of Organic Montmorillonite 5 g sodium montmorillonite, 3 g cetyl trimethyl ammonium chloride and 100 ml distilled water are added into a 250 ml flask, the mixture in the flask is agitated for 4 h at 120 rpm agitation speed while the flash is kept in water bath at 80° C. and then is held still over night; then the liquid supernatant is removed, the mixture is filtered and then washed with deionized water till there is no left (tested with 0.01 mol/L $AgNO_3$ solution); next the obtained mixture is dried in a vacuum oven at 70° C. and then crushed and screened through a 300 mesh sieve to obtain organic montmorillonite (O-MMT).

2. Preparation of Structured Nanometer Film Reservoir Protecting Agent (1) Styrene, benzyl dithiobenzoate and 2,2'-azobis(2-methylpropionitrile) are added at 400:1:0.4 molar ratio into a three-neck flask equipped with a thermometer and a mechanical agitator, and then organic montmorillonite in quantity equal to 5 wt % of the styrene is added. The reaction device is sealed, chilled and vacuum-pumped to remove the air in the system, nitrogen is charged into the reaction device, repeat for three cycles, the mixture is agitated intensively under nitrogen protection and then the reaction device is held in oil bath at 120° C. for reaction. After reaction for 4 h the reaction system is cooled in ice water bath, the product is precipitated in methanol and filtered and then the precipitate is dried in vacuum at 70° C.; finally a polystyrene/montmorillonite (PSt/O-MMT) nanometer composite macromolecular chain transfer agent is obtained.

(2) The PSt/O-MMT nanometer composite macromolecular chain transfer agent obtained in step (1) is added into a three-neck flask equipped with a thermometer and a mechanical agitator, 2-acrylamido-2-methyl propanesulfonic acid in quantity equivalent to 3 times of the mole number of the styrene used in step (1) and 2,2'-azobis(2-methylpropionitrile) in quantity equal to 4 wt % of the 2-acrylamido-2-methyl propanesulfonic acid are added into the three-neck flask, a tetrahydrofuran organic solvent is used as a reaction medium. The reaction device is sealed, chilled and vacuum-pumped to remove the air in the system, and nitrogen is charged, repeat for 3 cycles, the mixture is agitated intensively under nitrogen protection and then the reaction device is held in water bath at 70° C. for reaction. After reaction for 10 h the reaction system is cooled in ice water bath, the product is precipitated in methanol and filtered and then the precipitate is extracted with methyl benzene in an extractor to remove the polystyrene homopolymer and then is dried in vacuum at 70° C. and crushed; thus a structured nanometer film reservoir protecting agent A1 is obtained.

Preparation Example 2

Organic montmorillonite is prepared with the method used in the preparation example 1 and the method for preparation of the structured nanometer film reservoir protecting agent is as follows:

(1) P-methyl styrene, cumenyl dithiobenzoate and 2,2'-azobisisoheptonitrile are added at 200:1:0.3 molar ratio into a three-neck flask equipped with a thermometer and a mechanical agitator, and then organic montmorillonite in quantity equal to 3 wt % of the p-methyl styrene is added. The reaction device is sealed, chilled and vacuum-pumped to remove the air in the system, nitrogen is charged into the reaction device, repeat for three cycles, the mixture is agitated intensively under nitrogen protection and then the reaction device is held in oil bath at 130° C. for reaction. After reaction for 2.5 h the reaction system is cooled in ice water bath, the product is precipitated in methanol and filtered and then the precipitate is dried in vacuum at 70° C.; finally a poly-p-methyl styrene/montmorillonite nanometer composite macromolecular chain transfer agent is obtained.

(2) The poly-µ-methyl styrene/montmorillonite nanometer composite macromolecular chain transfer agent obtained in step (1) is added into a three-neck flask equipped with a thermometer and a mechanical agitator, 2-acrylamido-2-methyl propanesulfonic acid in quantity equivalent to 2 times of the mole number of the p-methyl styrene used in step (1) and 2,2'-azobisisoheptonitrile in quantity equal to 3 wt % of the 2-acrylamido-2-methyl propanesulfonic acid are added into the three-neck flask, a tetrahydrofuran organic solvent is used as a reaction medium. The reaction device is sealed, chilled and vacuum-pumped to remove the air in the system, and nitrogen is charged, repeat for 3 cycles, the mixture is agitated intensively under nitrogen protection and then the reaction device is held in water bath at 60° C. for reaction. After reaction for 12 h the reaction system is cooled in ice water bath, the product is precipitated in methanol and filtered and then the precipitate is extracted with methyl benzene in an extractor to remove the poly-p-methyl styrene homopolymer and then is dried in vacuum at 70° C. and crushed; thus a structured nanometer film reservoir protecting agent A2 is obtained.

Preparation Example 3

Organic montmorillonite is prepared with the method used in the preparation example 1 and the method for preparation of the structured nanometer film reservoir protecting agent is as follows:

(1) P-methoxy styrene, cumyl dithiobenzoate and dibenzoyl peroxide are added at 300:1:0.35 molar ratio into a three-neck flask equipped with a thermometer and a mechanical agitator, and then organic montmorillonite in quantity equal to 4 wt % of the p-methoxy styrene is added. The reaction device is sealed, chilled and vacuum-pumped to remove the air in the system, nitrogen is charged into the reaction device, repeat for three cycles, the mixture is agitated intensively under nitrogen protection and then the reaction device is held in oil bath at 110° C. for reaction. After reaction for 5 h the reaction system is cooled in ice water bath, the product is precipitated in methanol and filtered and then the precipitate is dried in vacuum at 70° C.; finally a poly-p-methoxy styrene/montmorillonite nanometer composite macromolecular chain transfer agent is obtained.

(2) The poly-p-methoxy styrene/montmorillonite nanometer composite macromolecular chain transfer agent obtained in step (1) is added into a three-neck flask equipped with a thermometer and a mechanical agitator, 2-acrylamido-2-methyl propanesulfonic acid in quantity equivalent to 4 times of the mole number of the p-methoxy styrene used in step (1) and dibenzoyl peroxide in quantity equal to 5 wt % of the 2-acrylamido-2-methyl propanesulfonic acid are added into the three-neck flask, a tetrahydrofuran organic solvent is used as a reaction medium. The reaction device is sealed, chilled and vacuum-pumped to remove the air in the system, and nitrogen is charged, repeat for 3 cycles, the mixture is agitated intensively under nitrogen protection and then the reaction device is held in water bath at 70° C. for reaction. After reaction for 8 h the reaction system is cooled in ice water bath, the product is precipitated in methanol and filtered and then the precipitate is extracted with methyl benzene in an extractor to remove the poly-p-methoxy styrene homopolymer and then is dried in vacuum at 70° C. and crushed; thus a structured nanometer film reservoir protecting agent A3 is obtained.

Preparation Example 4

Organic montmorillonite is prepared with the method used in the preparation example 1 and the method for preparation of the structured nanometer film reservoir protecting agent is as follows:

(1) P-n-butyl styrene, 2-cyanoprop-2-yl dithionaphthalenoate and 1,1'-azobis(cyclohexane-1-carbonitrile) are added at 500:1:0.5 molar ratio into a three-neck flask equipped with a thermometer and a mechanical agitator, and then organic montmorillonite in quantity equal to 8 wt % of the p-n-butyl styrene is added. The reaction device is sealed, chilled and vacuum-pumped to remove the air in the system, nitrogen is charged into the reaction device, repeat for three cycles, the mixture is agitated intensively under nitrogen protection and then the reaction device is held in oil bath at 130° C. for reaction. After reaction for 4 h the reaction system is cooled in ice water bath, the product is precipitated in methanol and filtered and then the precipitate is dried in vacuum at 70° C.; finally a poly-p-n-butyl styrene/montmorillonite nanometer composite macromolecular chain transfer agent is obtained.

(2) The poly-p-n-butyl styrene/montmorillonite nanometer composite macromolecular chain transfer agent obtained in step (1) is added into a three-neck flask equipped with a thermometer and a mechanical agitator, 2-acrylamido-2-methyl propanesulfonic acid in quantity equivalent to 5 times of the mole number of the p-n-butyl styrene used in step (1) and 1,1'-azobis(cyclohexane-1-carbonitrile) in quantity equal to 8 wt % of the 2-acrylamido-2-methyl propanesulfonic acid are added into the three-neck flask, a tetrahydrofuran organic solvent is used as a reaction medium. The reaction device is sealed, chilled and vacuum-pumped to remove the air in the system, and nitrogen is charged, repeat for 3 cycles, the mixture is agitated intensively under nitrogen protection and then the reaction device is held in water bath at 70° C. for reaction. After reaction for 12 h the reaction system is cooled in ice water bath, the product is precipitated in methanol and filtered and then the precipitate is extracted with methyl benzene in an extractor to remove the poly-p-n-butyl styrene homopolymer and then is dried in vacuum at 70° C. and crushed; thus a structured nanometer film reservoir protecting agent A4 is obtained.

Example 1

A drilling fluid F1 is prepared according to the following recipe: 2% structured nanometer film reservoir protecting agent A1, 0.1% trimethyl-1-propanaminium iodide, 2% sodium montmorillonite, 3% potassium chloride, 3% sulfomethylated phenolic resin (purchased from Chengdu Chunfeng Petroleum Science and Technology Co. Ltd., the same below), 4% polyethylene glycol-4000, 3% SPNH (lignite resin purchased from Shandong Deshunyuan Petroleum Science & Technology Co. Ltd., the same below), 1% PAC-HV (polyanionic cellulose purchased from Shandong Yanggu Jiangbei Chemicals Co. Ltd., the same below), 0.2% polyacrylamide (purchased from Zhengzhou Huajing Chemicals Co. Ltd. with weight-average molecular weight=10 millions, the same below), 1% sodium silicate, 0.3% $Na_2CO_3$ and water (accounts for the remaining content). The percentages of the constituents in the above-mentioned drilling fluid are mass to volume ratios; for example 2% structured nanometer film reservoir protecting agent A1 means that the amount of the structured nanometer film reservoir protecting agent A1 in 100 ml drilling fluid is 2 g.

Example 2

A drilling fluid F2 is prepared according to the following recipe: 3% structured nanometer film reservoir protecting agent A2, 0.1% trimethyl-1-propanaminium iodide, 2% sodium montmorillonite, 3% potassium chloride, 3% sulfomethylated phenolic resin, 4% polyethylene glycol-4000, 3% SPNH, 1% PAC-HV, 0.2% polyacrylamide, 1% sodium silicate, 0.3% $Na_2CO_3$ and water (accounts for the remaining content).

Example 3

A drilling fluid F3 is prepared according to the following recipe: 2.5% structured nanometer film reservoir protecting agent A3, 0.1% trimethyl-1-propanaminium iodide, 2% sodium montmorillonite, 3% potassium chloride, 3% sulfomethylated phenolic resin, 4% polyethylene glycol-4000, 3% SPNH, 1% PAC-HV, 0.2% polyacrylamide, 1% sodium silicate, 0.3% $Na_2CO_3$ and water (accounts for the remaining content).

Example 4

The method described in the example 1 is used, except that the structured nanometer film reservoir protecting agent A1 is replaced with the structured nanometer film reservoir protecting agent A4. A drilling fluid F4 is obtained.

Example 5

The method described in example 1 is used, except that the content of the structured nanometer film reservoir protecting agent A1 is 1.94% and the content of the trimethyl-1-propanaminium iodide is 0.16%.

Comparative Example 1

The method described in the example 1 is used, except that the structured nanometer film reservoir protecting agent A1 and the trimethyl-1-propanaminium iodide are not added in the drilling fluid, i.e. a drilling fluid DF1 is prepared according to the following recipe: 2% sodium montmorillonite, 3% potassium chloride, 3% sulfomethylated phenolic resin, 4% polyethylene glycol-4000, 3% SPNH, 1% PAC-HV, 0.2% polyacrylamide, 1% sodium silicate, 0.3% $Na_2CO_3$ and water (accounts for the remaining content).

Comparative Example 2

The method described in the example 1 is used, except that the structured nanometer film reservoir protecting agent A1 is not added in the drilling fluid, i.e. a drilling fluid DF2 is prepared according to the following recipe: 0.1% trimethyl-1-propanaminium iodide, 2% sodium montmorillonite, 3% potassium chloride, 3% sulfomethylated phenolic resin, 4% polyethylene glycol-4000, 3% SPNH, 1% PAC-HV, 0.2% polyacrylamide, 1% sodium silicate, 0.3% $Na_2CO_3$ and water (accounts for the remaining content).

Comparative Example 3

The method described in the example 1 is used, except that the trimethyl-1-propanaminium iodide is not added in the drilling fluid, i.e. a drilling fluid DF3 is prepared according to the following recipe: 2% structured nanometer film reservoir protecting agent A1, 2% sodium montmorillonite, 3% potassium chloride, 3% sulfomethylated phenolic resin, 4% polyethylene glycol-4000, 3% SPNH, 1% PAC-HV, 0.2% polyacrylamide, 1% sodium silicate, 0.3% $Na_2CO_3$ and water (accounts for the remaining content).

Comparative Example 4

A drilling fluid DF4 is prepared according to the following recipe: 2% sodium montmorillonite, 3% potassium chloride, 3% sulfomethylated phenolic resin, 4% polyethylene glycol-4000, 3% SPNH, 1% PAC-HV, 0.2% polyacrylamide, 1% sodium silicate, 2.1% $CaCO_3$ (super-fine calcium carbonate powder purchased from Zibo Jianzhi Industry & Trade Co. Ltd. at 800-2000 mesh granularity), 0.3% $Na_2CO_3$ and water (accounts for the remaining content).

Test Example 1

Rheology property test: 400 mL drilling fluids F1-F5 and DF1-DF4 are taken and agitated for 10 min. at 5000 rpm agitation speed respectively; then the apparent viscosity (AV, mPa·s), plastic viscosity (PV, mPa·s), yield point (YP, Pa), 10 s and 10 min. gel strengths and API filter loss at medium pressure (FL, mL) of each of the drilling fluids are measured respectively according to GB/T16783.1-2006. The results are shown in Table 1.

TABLE 1

| Drilling fluid | AV, mPa·s | PV, mPa·s | YP, Pa | 10 s/10 min | API, mL |
|---|---|---|---|---|---|
| F1 | 73 | 40 | 34 | 4/5 | 2.0 |
| F2 | 74 | 41.5 | 33 | 4.5/5 | 1.8 |
| F3 | 76 | 42 | 35 | 5/5.5 | 1.7 |
| F4 | 78 | 43.5 | 35 | 5/6 | 2.4 |
| F5 | 76 | 39 | 38 | 4.5/5 | 2.2 |
| DF1 | 72 | 37 | 36 | 5/6.5 | 4.8 |
| DF2 | 73 | 38 | 36 | 4/4.5 | 4.6 |
| DF3 | 77 | 37 | 41 | 5.5/6.5 | 2.1 |
| DF4 | 75 | 38 | 38 | 5.5/6 | 4.3 |

It can be seen from Table 1 that the API filter loss of the drilling fluid can be reduced obviously after the reservoir protecting agent composition provided in the present invention is added into the drilling fluid.

Test Example 2

Temperature-resistant property test: 400 mL drilling fluids F1-F5 and DF1-DF4 are taken and agitated for 20 min. at 5000 rpm agitation speed and then added into an aging can respectively; each of the aging can is loaded into a roller hearth and is rolled for 16 h at 150° C. constant temperature, then the aging can is taken out from the roller hearth and cooled to room temperature; next the drilling fluid is agitated for 20 min. at 5000 rpm agitation speed and then the apparent viscosity (AV, mPa·s), plastic viscosity (PV, mPa·s), yield point (YP, Pa), 10 s and 10 min. gel strengths, API filter loss at medium pressure (FL, mL) and filter loss at high temperature and high pressure ($FL_{HTHP}$, mL, at 150° C.) of each of the drilling fluids are measured respectively according to GB/T16783.1-2006. The results are shown in Table 2.

TABLE 2

| Drilling fluid | AV, mPa·s | PV, mPa·s | YP, Pa | 10 s/10 min | API, mL | $FL_{HTHP}$, mL |
|---|---|---|---|---|---|---|
| F1 | 71 | 41 | 30.7 | 3/4.5 | 1.8 | 2.3 |
| F2 | 71 | 40 | 31.7 | 3/4 | 1.6 | 2.2 |
| F3 | 73 | 44 | 29.6 | 3.5/4.5 | 1.5 | 2.0 |
| F4 | 74 | 43 | 31.7 | 4/4.5 | 2.1 | 2.7 |
| F5 | 73 | 36 | 38 | 3/3.5 | 1.9 | 2.5 |
| DF1 | 70 | 32 | 39 | 4/4.5 | 3.9 | 6.6 |
| DF2 | 70 | 34 | 37 | 2.5/3 | 3.8 | 6.3 |
| DF3 | 72 | 33 | 40 | 3.5/4.5 | 1.8 | 2.4 |
| DF4 | 71 | 34 | 38 | 3.5/4 | 3.7 | 6.1 |

It can be seen from Table 2 that the API filter loss and HTHP filter loss of the drilling fluid can be reduced obviously after the reservoir protecting agent composition provided in the present invention is added into the drilling fluid.

Test Example 3

The reservoir protection performance of the drilling fluids F1-F5 and DF1-DF4 are tested according to SYT6540-2002 "Lab Testing Method of Drilling and Completion Fluids Damaging Oil Formation" on a JHMD-1 HTHP dynamic filter tester respectively. The results are shown in Table 3 wherein the original permeability values of the well cores used in the test are the Initial Values in Table 3.

TABLE 3

| Drilling fluid | Well Core No. | Permeability to oil/$10^{-3}$ μm² | | | Permeability Recovery Rate/% | |
|---|---|---|---|---|---|---|
| | | Initial Value | After Plugging | Plugging Rate/% | Before Damage | After End Face Cutting |
| F1 | 1 | 18.3 | 1.1 | 94.0 | 93.8 | 95.2 |
| F2 | 2 | 19.6 | 0.9 | 95.4 | 94.5 | 95.7 |
| F3 | 3 | 17.9 | 0.7 | 96.1 | 94.9 | 96.4 |
| F4 | 4 | 19.4 | 1.3 | 93.3 | 93.2 | 94.1 |
| F5 | 5 | 18.5 | 1.2 | 93.5 | 93.5 | 94.8 |
| DF1 | 6 | 16.8 | 4.9 | 70.8 | 74.6 | 83.1 |
| DF2 | 7 | 17.1 | 2.2 | 87.1 | 86.4 | 88.4 |
| DF3 | 8 | 18.4 | 1.4 | 92.4 | 87.1 | 89.5 |
| DF4 | 9 | 20.4 | 4 | 80.4 | 79.5 | 85.3 |

It can be seen from Table 3 that the drilling fluid containing the reservoir protecting agent composition provided in the present invention exhibits significantly better reservoir plugging effect and permeability recovery capability.

In summary, it can be seen from the above data that the reservoir protecting agent composition provided in the present invention has a protective effect that is apparently suitable for low-permeability reservoirs and can attain an ideal reservoir protection effect when used in a drilling fluid.

While some preferred embodiments of the present invention are described above, the present invention is not limited to the details in those embodiments. Those skilled in the art can make modifications and variations to the technical scheme of the present invention without departing from the spirit of the present invention. However, all these modifications and variations shall be deemed as falling into the protected scope of the present invention.

In addition, it should be appreciated that the technical features described in the above embodiments can be combined in any appropriate manner provided that there is no conflict among the technical features in the combination. To avoid unnecessary iteration, such possible combinations are not described here in the present invention.

Moreover, those of skill in the art will recognize that different embodiments of the described herein can be combined freely so long as the combinations don't deviate from the general inventive concepts and spirit of the present invention. However, such combinations shall also be deemed as falling into the protected scope disclosed in the present invention.

The invention claimed is:

1. A reservoir protecting agent composition comprising a structured nanometer film reservoir protecting agent and a water block preventing agent, wherein the structured nanometer film reservoir protecting agent comprises montmorillonite laminas, structural units represented by formula (1) and structural units represented by formula (2),

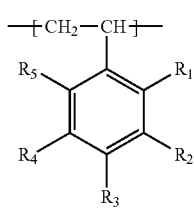

formula (1)

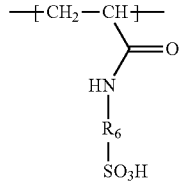

formula (2)

wherein each of $R_1$, $R_2$, $R_3$, $R_4$ and $R_5$ is independently selected from H, $C_1$-$C_4$ alkyl and $C_1$-$C_4$ alkoxy, $R_6$ is $C_1$-$C_6$ alkylene, and wherein the water block preventing agent is trimethyl-1-propanaminium iodide.

2. The reservoir protecting agent composition according to claim 1, wherein the mass ratio of the structured nanometer film reservoir protecting agent to the water block preventing agent is 100:1 to 100:10.

3. The reservoir protecting agent composition according to claim 2, wherein the mass ratio of the structured nanometer film reservoir protecting agent to the water block preventing agent is 100:3 to 100:6.

4. The reservoir protecting agent composition according to claim 2, wherein the structured nanometer film reservoir protecting agent and the water block preventing agent are packed respectively and independently.

5. The reservoir protecting agent composition according to claim 1, wherein in the reservoir protecting agent composition, each of $R_1$, $R_2$, $R_3$, $R_4$ and $R_5$ is independently selected from H, $C_1$-$C_3$ alkyl and $C_1$-$C_3$ alkoxy, $R_6$ is methylene, ethylidene, propylidene or butylidene.

6. The reservoir protecting agent composition according to claim 5, wherein each of $R_1$, $R_2$, $R_3$, $R_4$ and $R_5$ is independently selected from H, methyl, ethyl, methoxy and ethoxy, $R_6$ is butylidene.

7. The reservoir protecting agent composition according to claim 6, wherein each of $R_1$, $R_2$, $R_3$, $R_4$ and $R_5$ is independently selected from H, methyl and ethyl.

8. The reservoir protecting agent composition according to claim 1, wherein in the reservoir protecting agent composition, the mass ratio of the structural units represented by formula (1) to the montmorillonite laminas is 1:0.02 to 1:0.1, the molar ratio of the structural units represented by formula (1) to the structural units represented by formula (2) is 1:1 to 1:5.

9. The reservoir protecting agent composition according to claim 8, wherein the mass ratio of the structural units represented by formula (1) to the montmorillonite laminas is 1:0.03 to 1:0.05, the molar ratio of the structural units represented by formula (1) to the structural units represented by formula (2) is 1:2 to 1:4.

10. The reservoir protecting agent composition according to claim 1, wherein the structured nanometer film reservoir protecting agent is prepared with a method comprising:
  (1) intercalating a monomer M1 into organic montmorillonite, adding a chain-transfer agent and a first initiator, and polymerizing to obtain [M1]n/montmorillonite;
  (2) using the [M1]n/montmorillonite obtained in step (1) as a macromolecular chain transfer agent, mixing the [M1]n/montmorillonite with a second initiator and a monomer M2, polymerizing, and removing the [M1]n homopolymer in the reaction product to obtain a structured nanometer film reservoir protecting agent;
  wherein the structural formulaes of the monomer M1 and the monomer M2 are:

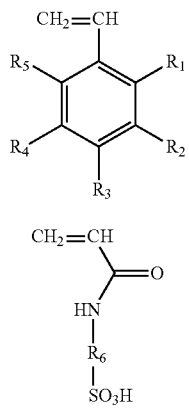

M1

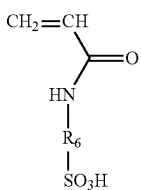

M2 wherein each of $R_1$, $R_2$, $R_3$, $R_4$ and $R_5$ is independently selected from H, $C_1$-$C_4$ alkyl and $C_1$-$C_4$ alkoxy, $R_6$ is $C_1$-$C_6$ alkylene.

11. The reservoir protecting agent composition according to claim 10, wherein in the method, each of $R_1$, $R_2$, $R_3$, $R_4$ and $R_5$ is independently selected from H, $C_1$-$C_3$ alkyl and $C_1$-$C_3$ alkoxy, $R_6$ is methylene, ethylidene, propylidene or butylidene.

12. The reservoir protecting agent composition according to claim 11, wherein in the method, each of $R_1$, $R_2$, $R_3$, $R_4$ and $R_5$ is independently selected from H, methyl, ethyl, methoxy and ethoxy, $R_6$ is butylidene.

13. The reservoir protecting agent composition according to claim 12, wherein in the method, each of $R_1$, $R_2$, $R_3$, $R_4$ and $R_5$ is independently selected from H, methyl and ethyl.

14. The reservoir protecting agent composition according to claim 10, wherein in step (1), the mass ratio of the monomer M1 to the organic montmorillonite is 1:0.02 to 1:0.1, the molar ratio of the monomer M1, the chain-transfer agent and the first initiator is 200 to 600:1:0.2 to 0.6; and the molar ratio of the monomer M2 in step (2) to the monomer M1 in step (1) is 1:1 to 5:1, and in step (2) the mass ratio of the monomer M2 to the second initiator is 1:0.02 to 1:0.1.

15. The reservoir protecting agent composition according to claim 14, wherein in step (1), the mass ratio of the monomer M1 to the organic montmorillonite is 1:0.03 to 1:0.05, the molar ratio of the monomer M1, the chain-transfer agent and the first initiator is 200 to 400:1:0.3 to 0.4); and the molar ratio of the monomer M2 in step (2) to the monomer M1 in step (1) is 2:1 to 4:1, and in step (2) the mass ratio of the monomer M2 to the second initiator is 1:0.03 to 1:0.05.

16. The reservoir protecting agent composition according to claim 10, wherein the chain-transfer agent is at least one of benzyl dithiobenzoate, 2-cyanoprop-2-yl dithionaphthalenoate, cumyl dithiobenzoate and cumenyl dithiobenzoate; and the first initiator is at least one of 2,2'-azobis(2-methylpropionitrile), 1,1'-azobis(cyclohexane-1-carbonitrile), dibenzoyl peroxide and 2,2'-azobisisoheptonitrile; and the second initiator is at least one of 2,2'-azobis(2-methylpropionitrile), 1,1'-azobis(cyclohexane-1-carbonitrile), dibenzoyl peroxide and 2,2'-azobisisoheptonitrile.

17. A drilling fluid comprising a reservoir protecting agent composition, the reservoir protecting agent composition comprising:

a structured nanometer film reservoir protecting agent, wherein the structured nanometer film reservoir protecting agent comprises montmorillonite laminas, structural units represented by formula (1) and structural units represented by formula (2),

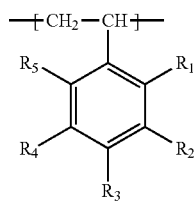

formula (1)

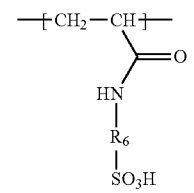

formula (2)

wherein each of $R_1$, $R_2$, $R_3$, $R_4$ and $R_5$ is independently selected from H, $C_1$-$C_4$ alkyl and $C_1$-$C_4$ alkoxy, $R_6$ is $C_1$-$C_6$ alkylene; and a water block preventing agent, wherein the water block preventing agent is trimethyl-1-propanaminium iodide.

18. The drilling fluid according to claim 17, wherein measured on the basis of 100 ml drilling fluid, the amount of the reservoir protecting agent composition is 1-5 g.

* * * * *